US006430501B1

(12) United States Patent
Slominski

(10) Patent No.: US 6,430,501 B1
(45) Date of Patent: Aug. 6, 2002

(54) NAVIGATION SYSTEM WITH ROUTE INDICATORS

(75) Inventor: Anthony Albert Slominski, Harrison Township, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/487,654

(22) Filed: Jan. 19, 2000

(51) Int. Cl.[7] ........................ G06F 165/00; G08G 1/123
(52) U.S. Cl. .................. 701/209; 701/210; 701/202; 701/208; 701/300; 340/988; 345/146; 342/357
(58) Field of Search ................................. 701/209, 211, 701/212; 340/990, 995

(56) References Cited

U.S. PATENT DOCUMENTS

| 4,086,632 A | | 4/1978 | Lions ........................... 343/112 |
|---|---|---|---|
| 5,243,528 A | | 9/1993 | Lefebvre ...................... 340/995 |
| 5,402,120 A | | 3/1995 | Fujii et al. ................... 340/988 |
| 5,537,323 A | | 7/1996 | Schulte ......................... 340/988 |
| 5,654,892 A | | 8/1997 | Fujii et al. ................... 340/988 |
| 5,654,908 A | | 8/1997 | Yokoyama ................... 340/995 |
| 5,731,978 A | | 3/1998 | Tamai et al. ................. 340/988 |
| 5,732,385 A | | 3/1998 | Nakayama et al. .......... 701/201 |
| 5,739,772 A | * | 4/1998 | Nanba et al. ................ 340/990 |
| 5,793,310 A | | 8/1998 | Watanabe et al. ........... 340/995 |
| 5,802,492 A | | 9/1998 | DeLorme et al. ........... 701/200 |
| 5,832,408 A | * | 11/1998 | Tamai et al. ................. 701/208 |
| 5,835,881 A | | 11/1998 | Trovato et al. .............. 701/200 |
| 5,842,147 A | | 11/1998 | Nimura et al. ............... 701/211 |
| 5,862,510 A | * | 1/1999 | Saga et al. ................... 701/211 |
| 5,877,708 A | * | 3/1999 | Hijikata ....................... 340/995 |
| 5,905,451 A | | 5/1999 | Sakashita ..................... 340/988 |
| 5,908,464 A | * | 6/1999 | Kishigami et al. ........... 701/208 |
| 5,936,631 A | | 8/1999 | Yano et al. ................... 345/428 |
| 5,961,570 A | * | 10/1999 | Inamori ........................ 701/200 |
| 6,049,755 A | * | 4/2000 | Lou et al. ..................... 701/207 |
| 6,067,502 A | * | 5/2000 | Hayashida et al. .......... 701/209 |

FOREIGN PATENT DOCUMENTS

| EP | 0767448 | 4/1997 |
|---|---|---|
| EP | 0779498 | 6/1997 |
| EP | 0803708 | 10/1997 |
| GB | 2260210 | 7/1993 |
| GB | 2333838 | 4/1999 |
| GB | 2334102 | 11/1999 |

\* cited by examiner

Primary Examiner—William A. Cuchlinski, Jr.
Assistant Examiner—Tuan C To
(74) Attorney, Agent, or Firm—Carlson & Gaskey & Olds

(57) ABSTRACT

A navigation system displays a recommended route on a map display of road segments with a plurality of arrows arranged on the recommended route toward the destination. The recommended route is highlighted in a color different from other road segments on the map display and arrows of yet another color are also displayed along the recommended route oriented toward the destination.

36 Claims, 2 Drawing Sheets

NAVIGATION SYSTEM WITH ROUTE INDICATORS

BACKGROUND OF THE INVENTION

The present invention relates generally to navigation systems and more particularly to a navigation system with an improved display for displaying a recommended route to a destination.

A known navigation system includes motion and position determining devices which determine the position of the vehicle relative to a map database. Using a user interface, a user can select a destination in the map database. The navigation system calculates a recommended route from the current position of the vehicle to the destination, then guides the user to the destination along the recommended route. The recommended route is displayed as a map from the current position toward the destination. On the display, the recommended route is "highlighted" by being displayed in a different color from the other roads.

In the known navigation system, the roads on the map may already be displayed in several different colors. Different colors of the roads on the map display represent roads of different levels, i.e., highways versus main roads, versus side streets. As a result, the recommended route, which is shown as yet another color, may not stand out sufficiently.

SUMMARY OF THE INVENTION

The present invention provides a navigation system which displays a recommended route on a map display of road segments with a plurality of arrows arranged on the recommended route toward the destination. The recommended route is highlighted in a color different from other road segments on the map display and arrows of yet another color are also displayed along the recommended route oriented toward the destination.

The positioning of the arrows depends upon the current scale of the displayed map (zoom level). As the scale of the map increases, the represented distance between the arrows increases, such that the arrows appear to stay in the same position on the display. To place the arrows on the highlighted route, the distance of each road segment is calculated. These distances are added together. An arrow is drawn when the summed distance equals a predetermined value selected based upon the current map scale.

In the present invention, the recommended route is more easily visible and is more distinguishable because of the arrows. In a more complicated route, such as a route that crosses over itself, the arrows assist the observer in discerning and understanding the route quickly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
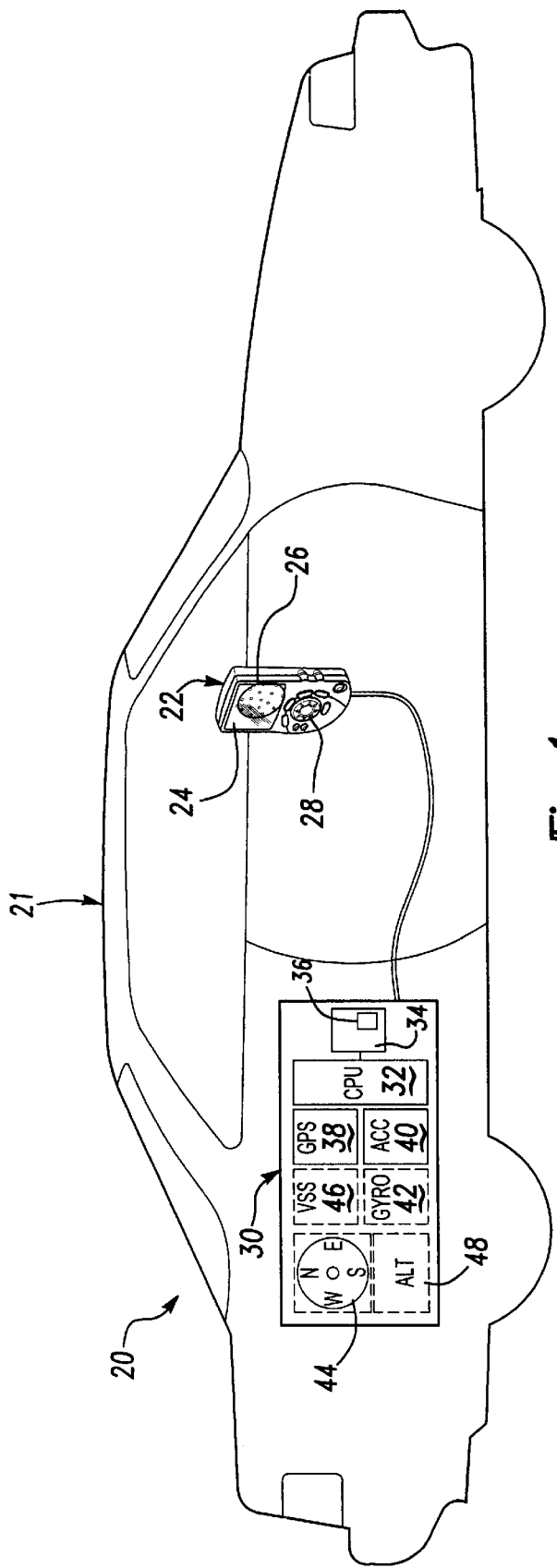
FIG. 1 is schematic of the navigation system of the present invention.

The navigation system 20 of the present invention is shown schematically in FIG. 1 installed in a vehicle 21. The navigation system 20 includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a computer module 30 connected to the OIM 22. The computer module 30 includes a CPU 32 and storage device 34 connected to the CPU 32. The storage device 34 may include a hard drive, CD-ROM, DVD, RAM, ROM or other optically readable storage, magnetic storage or integrated circuit. The storage device 34 contains a database 36 including a map of all the roads in the area to be traveled by the vehicle 21 as well as the locations of potential destinations, such as addresses, hotels, restaurants, or previously stored locations. The software for the CPU 32, including the graphical user interface, route guidance, operating system, position-determining software, etc may also be stored in storage device 34 or alternatively in ROM, RAM or flash memory.

The computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The navigation system 20 propagates the position of the vehicle 21 relative to the map database 36, i.e. relative to road segments and intersections. The navigation system 20 also determines the current location of the vehicle 21 in terms of latitude and longitude. Generally, the CPU 32 and position and motion determining devices determine the position of the vehicle 21 relative to the database 36 of roads utilizing dead reckoning, map matching, etc. Further, as is known in navigation systems, the user can select a destination relative to the database 36 of roads utilizing the input device 28 and the display 24. The navigation system 20 then calculates and displays a recommended route directing the driver of the vehicle 21 to the desired destination. Preferably, the navigation system 20 displays turn-by-turn instructions on display 24 and gives corresponding audible instructions on audio speaker 26, guiding the driver to the desired destination.

Figure 2:
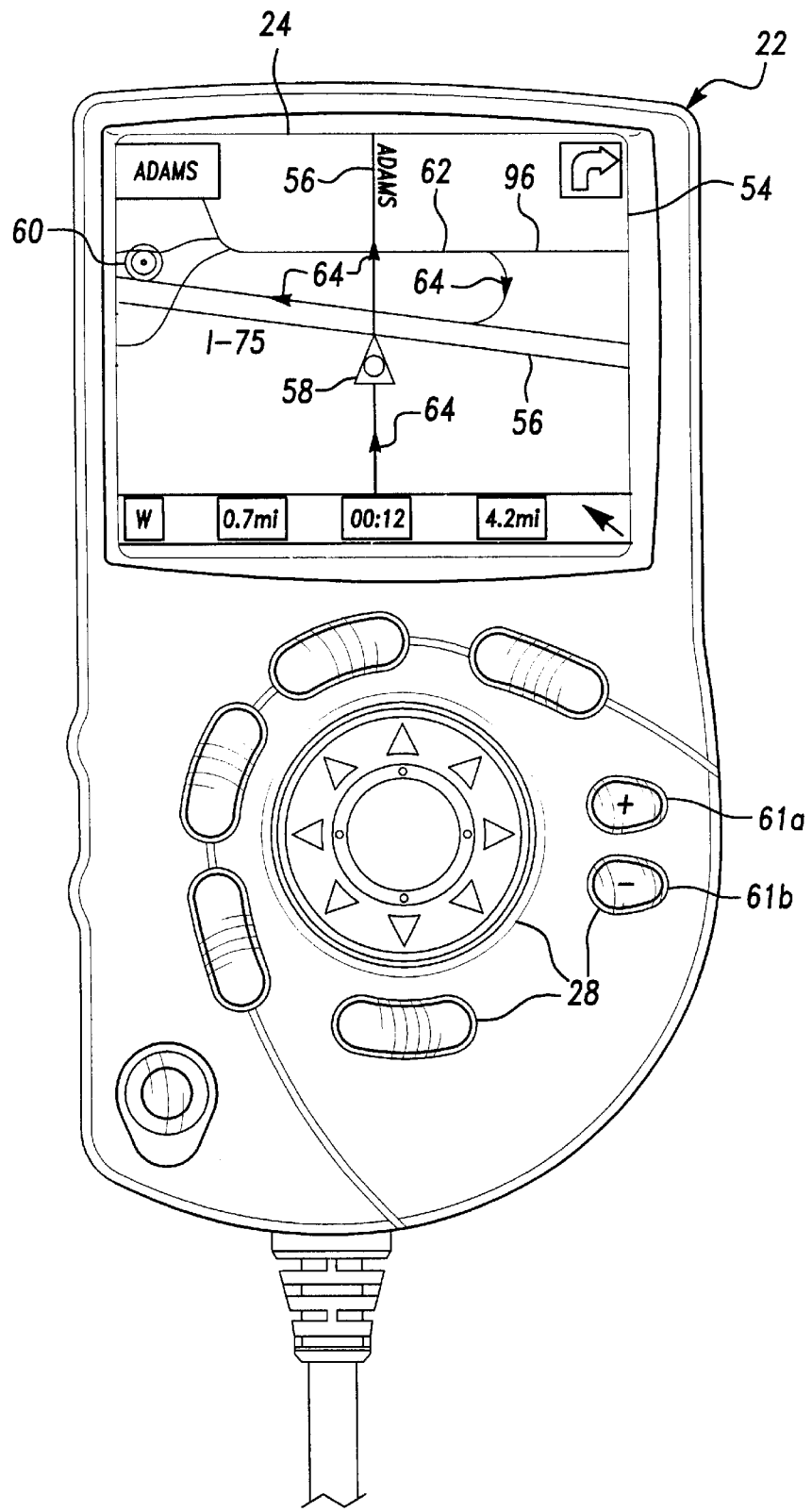
FIG. 2 is the OIM and display of FIG. 1 showing the map display of the present invention.

FIG. 2 illustrates the OIM 22 of FIG. 1 with the display 24 displaying a map display screen 54. Map display screen 54 displays a plurality of road segments 56 and a vehicle icon 58 at its current position relative to the road segments 56, as determined by the navigation system 20. A road segment 56 is defined as a portion of the road between intersections and other nodes or shape points. Road segments 56 are preferably displayed in different colors, according to the level of the particular road segment 56, i.e., interstate, main street or side street. The display 24 also displays a destination icon 60 at the location of the destination selected by the operator. Of course, whether the destination icon 60 is displayed on display 24 at a given moment depends upon the distance from the vehicle icon 58 to the destination icon 60 and the current scale of the map display, which is user-selectable using zoom input buttons 61a and 61b.

The map display screen 54 also displays the recommended route 62. The recommended route 62 comprises a plurality of the road segments 56 leading from the current position of the vehicle icon 58 to the destination icon 60. The recommended route 62 is preferably highlighted, i.e., displayed in a color different from all of the other road segments 56. The map display screen 54 also displays a plurality of arrows 64 along the recommended route 62 oriented toward the destination icon 60 from the vehicle icon 58. The arrows 64 are preferably displayed in a color different from all of the road segments 56 and the recommended route 62.

As the vehicle 21 moves, the map display screen 54 scrolls, keeping the vehicle icon 58 in the center of the map display screen 54. The arrows 64 scroll with the road segments 56 across the map display screen 54 as the vehicle icon 58 travels along the recommended route 62. On the map display screen 54, the arrows 64 appear to pass under the vehicle icon 58 as they scroll.

With the inventive map display screen 54 of FIG. 2, the user can more quickly and easily discern the recommended route on the map display screen 54 from the other road segments 56, because the recommended route is displayed in a different color and with the arrows 64. Arrows 64 also indicate to the observer the direction to be traveled along the recommended route 62. This is particularly important in the case where, as shown in FIG. 2, the recommended route 62 crosses over itself.

The positioning of the arrows 64 on the portion of the recommended route 62 displayed on the display 24 depends upon the current scale of the displayed map (zoom level). Preferably, as the scale of the map display screen 54 is increased and decreased (such as by the using pressing zoom input buttons 61a and 61b), some of the arrows 64 appear to stay generally in the same position relative to the display 24. In order to achieve this, the distance of each road segment 56 on map display screen 54 is calculated. The arrows 64 are spaced at an interval that is generally fixed, but varies based upon the current map display scale according to the following table:

| Map Scale | Meters Across Screen in X axis | Meters Across Screen in Y axis | Meters/ Arrow |
| --- | --- | --- | --- |
| 2 | 704 | 468 | 200 |
| 4 | 1408 | 936 | 400 |
| 16 | 5632 | 3744 | 1600 |
| 64 | 22528 | 14976 | 6400 |

Figure 3:
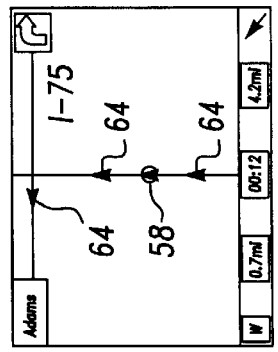
FIG. 3 is the display of FIG. 2 showing the map display with a different map scale.

FIG. 3 illustrates the map display screen 54 after the scale of the map display has been decreased. It should be noted that the vehicle icon 58 and some of the arrows 64 on the current road remain generally in the same position on the map display screen 54. Of course, some arrows 64 that were previously displayed in FIG. 2 are no longer on the map display screen 54 because some road segments 56 and some portions of road segments 56 are no longer displayed on map display screen 54. Because of the scale of the map display screen 54 in FIG. 3, the destination icon 60 of FIG. 2 is not displayed. Note from the above table that the interval between arrows 64 increases and decreases proportionally to the changes in the map scale. Generally, this provides a constant maximum number of arrows 64 in each of the X and Y directions on the display 24, independent of the current scale.

Preferably, the navigation system 20 includes other map display modes that would also utilize the route indication arrows 64. For example, in a turn by turn navigation mode, the map display screen 54 may be displayed to show the vehicle icon 58 and a plurality of consecutive maneuvers, particularly where the maneuvers are close together. It should also be appreciated that the destination 60 would not always be displayed on the map display screen 54. The destination 60 would only be displayed on map display screen 54 when in the field of view of display 24, depending upon the distance between the current vehicle position, as shown by vehicle icon 58, to the destination 60, and the current map zoom level. Further, the vehicle icon 58 would also not necessarily always be displayed in map display screen 54.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for displaying a route in a navigation system including the steps of:
   a. Selecting a destination from a map database;
   b. Calculating a recommended route to the destination in the map database;
   c. Displaying the recommended route including a plurality of arrows along the recommended route towards the destination; and
   d. Displaying road segments other than said recommended route, adjacent said recommended route, in at least one color different from a first color in which said recommended route is displayed.

2. The method of claim 1 further including the step of displaying road segments other than said recommended route, adjacent said recommended route, in at least one color different from a first color in which said recommended route is displayed.

3. The method of claim 1 further including the step of displaying said destination adjacent said recommended route.

4. The method of claim 1 further including the step of displaying a portion of the recommended route and not displaying said destination.

5. The method of claim 1 further including the step of displaying said plurality of arrows on said recommended route.

6. A method for displaying a route in a navigation system including the steps of:
   a. Selecting a destination from a map database;
   b. Calculating a recommended route to the destination in the map database;
   c. Displaying the recommended route including a plurality of arrows along the recommended route towards the destination; and
   d. Displaying said arrows in a color different from the color of the recommended route.

7. The method of claim 1 further including the steps of calculating a position on the display for each of the plurality of arrows and displaying each of said plurality of arrows at its calculated position.

8. The method of claim 7 further including the step of recalculating the position of each of said plurality of arrows after changing a scale of the display.

9. The method of claim 8 further including the step of changing an interval between said plurality of arrows proportionally to the changing of the scale of the display.

10. The method of claim 1 further including the step of displaying one of said plurality of arrows on a first road segment of said recommended route and another of said plurality of arrows on a second road segment of said recommended route.

11. The method of claim 1 wherein said recommended route crosses itself.

12. The method of claim 1 further including the step of scrolling said plurality of arrows with said recommended route as the recommended route is traveled.

13. A navigation system comprising:
 a user input device for selecting a destination;
 a CPU calculating a recommended route to the destination; and
 a display displaying a plurality of arrows on the recommended route to the destination wherein said display displays said plurality of arrows in a color different from said recommended route.

14. A navigation system comprising:
 a user input device for selecting a destination;
 a CPU calculating a recommended route to the destination; and
 a display displaying a plurality of arrows on the recommended route to the destination wherein said display displays road segments other than said recommended route in at least one color different from a first color in which said recommended route is displayed.

15. The navigation system of claim 13 wherein said CPU calculates a current position of the display.

16. The navigation system of claim 15 wherein said CPU receives a signal from at least one navigation sensor, said CPU calculating the current position based upon the signal.

17. The navigation system of claim 15 wherein said display displays said current location.

18. The navigation system of claim 13 wherein said display displays said plurality of arrows in a color different from said recommended route.

19. The navigation system of claim 13 wherein said display displays said destination.

20. The navigation system of claim 13 wherein said display scrolls said plurality of arrows with the recommended route as the recommended route is traveled.

21. A method for displaying a route in the navigation system including the steps of:
 a. Selecting a destination from a map database of road segments;
 b. Determining a current position of the navigation system relative to the map database;
 c. Calculating a recommended route to the destination in the map database;
 d. Displaying a plurality of said road segments including the recommended route;
 e. Displaying the current position relative to said plurality of road segments;
 f. Displaying a plurality of route indicators along the recommended route oriented towards the destination, including a first route indicator and a second route indicator on a first road segment and a third route indicator on a second road segment, said plurality of route indicators displayed in at least one color different from a first color in which said recommended route is displayed.

22. The method of claim 21 further including the step of recalculating the position of each of said plurality of route indicators based upon changing a scale of the display.

23. The method of claim 22 further including the step of changing an interval between said plurality of arrows proportionally to the changing of the scale of the display.

24. The method of claim 23 further including the step of scrolling said plurality of route indicators with said recommended route as the recommended route is traveled.

25. The method of claim 21 wherein said plurality of route indicators comprises a plurality of arrows.

26. The method of claim 21 wherein said step b. is performed after said step a.

27. A method for displaying a route in the navigation system including the steps or:
 a. Selecting a destination from a map database of road segments;
 b. Determining a current position of the navigation system relative to the map database;
 c. Calculating a recommended route to the destination in tile map database;
 d. Displaying a plurality of said road segments including the recommended route;
 e. Displaying the current position relative to said plurality of road segments;
 f. Displaying at least one arrow along the recommended route oriented towards the destination; and
 g. displaying said arrow in a color different from a color of the recommended route.

28. The method of claim 27 further including the step of scrolling said at least one arrow with said recommended route as the recommended route is traveled.

29. The method of claim 1, wherein said recommended route is displayed as a plurality of road segments.

30. The method of claim 29, wherein display displays road segments other than said recommended route.

31. The navigation system of claim 13, wherein said display displays said recommended route as a plurality of road segments.

32. The navigation system of claim 31, wherein said display displays road segments other than said recommended route.

33. The method of claim 30, wherein said step c. further includes the step of displaying the plurality of arrows on one of said road segments.

34. The method of claim 1, wherein said step c. further includes the step of displaying an icon representing a present location of the navigation system between two of the plurality of arrows.

35. The navigation system of claim 31, wherein said display displays said plurality of arrows on one of said plurality of road segments.

36. The navigation system of claim 13, wherein said display displays an icon representing a present location of the navigation system between two of the plurality of arrows.

* * * * *

UNITED STATES PATENT AND TRADEMARK OFFICE
CERTIFICATE OF CORRECTION

PATENT NO.     : 6,430,501 B1
DATED          : August 6, 2002
INVENTOR(S)    : Slominski It is certified that error appears in the above-identified patent and that said Letters Patent is hereby corrected as shown below:

<u>Column 6,</u>
Line 22, "tile" should be -- the --

Signed and Sealed this

Third Day of December, 2002

JAMES E. ROGAN
*Director of the United States Patent and Trademark Office*